(12) United States Patent
Nemeth

(10) Patent No.: US 8,855,249 B2
(45) Date of Patent: Oct. 7, 2014

(54) PREAMBLE DETECTION AT LOW SIGNAL-TO-NOISE LEVELS

(75) Inventor: Jozsef G. Nemeth, Budapest (HU)

(73) Assignee: Microchip Technology Incorporated, Chandler, AZ (US)

( * ) Notice: Subject to any disclaimer, the term of this patent is extended or adjusted under 35 U.S.C. 154(b) by 309 days.

(21) Appl. No.: 13/331,303

(22) Filed: Dec. 20, 2011

(65) Prior Publication Data

US 2012/0163514 A1 Jun. 28, 2012

Related U.S. Application Data

(60) Provisional application No. 61/427,253, filed on Dec. 27, 2010.

(51) Int. Cl.
*H03D 1/00* (2006.01)
*H04B 1/7077* (2011.01)
*H04L 7/04* (2006.01)

(52) U.S. Cl.
CPC .............. *H04B 1/7077* (2013.01); *H04L 7/046* (2013.01)
USPC ............ 375/343; 375/346; 375/347; 375/349

(58) Field of Classification Search
USPC .................................. 375/343, 346, 347, 349
See application file for complete search history.

(56) References Cited

U.S. PATENT DOCUMENTS

| | | | |
|---|---|---|---|
| 2005/0117675 A1* | 6/2005 | Das et al. ....................... | 375/343 |
| 2008/0205561 A1* | 8/2008 | Zhou et al. .................... | 375/346 |
| 2009/0154411 A1* | 6/2009 | Kikuchi et al. ............... | 370/329 |

FOREIGN PATENT DOCUMENTS

WO 2007/010331 A1 1/2007 ............. H04B 1/707

OTHER PUBLICATIONS

Villanti, Marco, et al., "A Novel Up-Link Code-Acquisition Procedure Based on a Structured Preamble Sequence", Spread Spectrum Techniques and Applications, 2004 IEEE 8$^{th}$ International Symposium on Sydney, Australia, pp. 588-592, Aug. 30, 2004.
Ho, Wong Sai, et al., "Rapid Acquisition for Multiband UWB Systems: *CAZAC* vs. *Barker Sequences*", Information, Communications and Signal Processing, vol. 3, pp. 1727-1731, Dec. 15, 2003.
International PCT Search Report and the Written Opinion, PCT/US2011/066525, 13 pages, Mar. 29, 2012.

* cited by examiner

*Primary Examiner* — Kabir A Timory
(74) *Attorney, Agent, or Firm* — King & Spalding L.L.P.

(57) ABSTRACT

A preamble detector has a correlator outputting for every sample position of the preamble part of an incoming sampled signal stream a score and associated class value; and a multiple cluster unit receiving the class and score output values from the correlator, wherein a first cluster receives output values from the correlator and the following clusters are coupled in series such that each cluster receives output values from the correlator and a preceding cluster and wherein the output values of the correlator and a cluster are processed such that an n-th cluster of the multiple cluster unit, with n>1, accumulates the highest score values of n score values with matching class values.

25 Claims, 8 Drawing Sheets

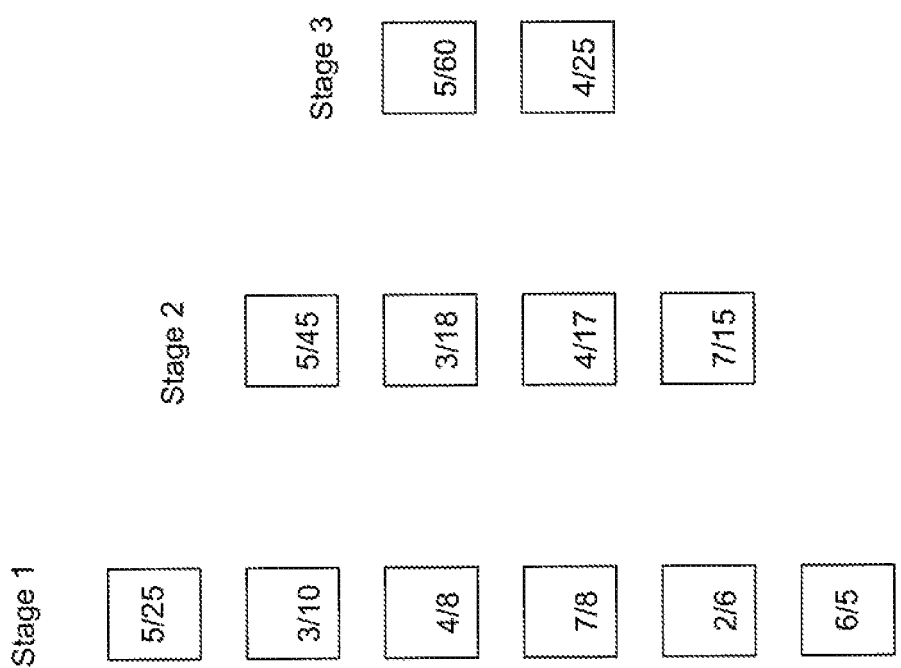

PREAMBLE DETECTION AT LOW SIGNAL-TO-NOISE LEVELS

CROSS-REFERENCE To RELATED APPLICATIONS

This application claims the benefit of U.S. Provisional Application No. 61/427,253 filed on Dec. 27, 2010, entitled "PREAMBLE DETECTION AT LOW SIGNAL-TO-NOISE LEVELS", which is incorporated herein in its entirety.

TECHNICAL FIELD

The present disclosure relates to digital communications, more particularly, to an advanced preamble detection strategy that can work reliably at low SNR levels where sophisticated demodulating/decoding techniques are still capable of recovering message data, although none of the techniques are available for preamble processing.

BACKGROUND

Establishing the starting boundary of a received message within the transport symbol stream is a common task in every wireless communication systems 100. As shown in FIG. 1, to this end, a transmitter 110 sends a special symbol sequence, the preamble, at the head of the message 120 proper; and in a receiver 130 the recovered preamble is stripped off the symbol stream and the rest is forwarded to message processing.

The full preamble, however, is never available to signal processing as an initial part of it is consumed by signal presence detection and AGC (Automatic/Adaptive Gain Control) settling. This together with other considerations leads to the universally adopted preamble structure: a multi-symbol preamble pattern (PP) repeated a number of (M) times immediately followed by a start-of-frame delimiter (SFD) sequence. Within receiver 130, search for the PP establishes a timing raster and finding the SFD starting at a raster point delimits the message start as shown in FIG. 2.

The signal available from the radio (after some preliminary processing) is the original preamble distorted by channel noise and carrier offset (carrier frequency difference between the transmitting and receiving devices). Direct matching is thus not possible; rather the correlation between segments of the input and the expected PP is computed. For the computation sampled versions of both signals are used, where the PP is represented as N samples.

The magnitude of the complex result provides a measure of similarity between the PP and the input segment currently processed. (Preamble patterns are designed to have good autocorrelation property.)

In principle, in order to find a sample position where a PP starts searches should be started at every preamble sample position as indicated in FIG. 3. The length of each search depends on how many, say K (<M) consecutive PPs do we want to use for making a decision. Searches that start N samples (the length of the PP) apart establish the same timing raster, i.e. find the same SFD provided at least one of them succeeds. These, we say, belong to the same search class $310_0$, $310_1$, $310_2$, etc. As can be seen in FIG. 3, there are N search classes $310_0$, $310_1$, $310_2$, ... arbitrarily numbered 0 to N−1 counting from the start of the searching process. In a class there may be at most K active searches: one into its first N-sample segments, one into its first 2N-sample sequence etc.

During the searching process received preamble samples are shifted into a single N-sample correlator 320. It starts operating after the first N samples of the preamble have been shifted in. From then on at each shifting step it outputs the matching score for the sample sequence it is currently looking at and the number of the search class it belongs to.

It is implicitly assumed that the higher the score the better the match is and that the score for a longer sequence in a class is the sum of the scores for its constituent subsequences. The search strategies differ in the way the data available is used to arrive to a decision.

Devices implementing common wireless standards invariably use the simple rule: if the current matching score exceeds a preset threshold the PP is found and the timing raster is established. The rule works as standards are designed such that at noise levels this fails to locate the PP message processing would fail with high probability as well.

The assumption, however, cannot be applied universally. With advanced symbol coding and data error control techniques message decoding can be made to work at much lower S/N (Symbol-to-Noise Ratio) levels. These techniques are not available to preamble detection thus it is vitally important that all information available in the received, noisy preamble is fully utilized in order to match the improvement in the message processing part of reception. In other words, the worse the SNR and/or higher the required detection reliability is the longer the preamble segment used in the search must be. This technology requires an unacceptably high number of logic gates. For example, when using a 125 kb/s data rate, 3~4 dB below the noise floor and in the presence of a large carrier offset, achieving a greater than 99.8% detection ratio requires a 5 preamble period search length. Considering that each preamble requires 8 symbols and each symbol requires 8 bit, results in a search length of 8*8*5=320 bit. In this example, implementing the textbook solution is estimated to consume about 50 k logic gates, which is, in many applications, an unacceptable size when compared to the silicon area available for the whole digital component.

SUMMARY

Therefore, what is needed is an efficient preamble detection method that utilizes all available information in the preamble while keeping the processing complexity and storage requirement at an acceptable level. Said method searches the frame preamble of the incoming frame for continuous repetitions of a preamble pattern and comprises the following steps.

According to an embodiment, a preamble detector may comprise a correlator outputting for every sample position of the preamble part of an incoming sampled signal stream a score and associated class value; and a multiple cluster unit receiving the class and score output values from the correlator, wherein a first cluster receives output values from the correlator and the following clusters are coupled in series such that each cluster receives output values from the correlator and a preceding cluster and wherein said output values of the correlator and a cluster are processed such that an n-th cluster of the multiple cluster unit, with n>1, accumulates the highest score values of n score values with matching class values.

According to a further embodiment, a score value can be determined from the value of the correlation of an N-sample preamble pattern and the sequence of N signal samples commencing at said position and wherein a class number is 0 at the starting sample position, incremented by 1 at each subsequent position and returns to 0 after the value N−1 is reached. According to a further embodiment, a first cluster may comprise M cells, each cell being operable to store a score and associated cell value and wherein each following cluster coupled in series has less cells than any preceding cluster.

According to a further embodiment, each cluster has three input connections for enable, class, and score, two output connections for valid, and score and comprises a control unit for updating, discarding and advancing values stored within a cluster. According to a further embodiment, the preamble detector may further comprise a plurality of adding units for coupling two clusters, wherein the adding units receive output score values of a preceding cluster and the output score values of the correlator and are operable to add the score values when the associated class values match. According to a further embodiment, each cluster may sort score values in said cells from highest to lowest value and updates and/or rearranges said cells corresponding to sequential incoming new score values. According to a further embodiment, a cluster can be formed by a plurality of cells forming a circular shift register. According to a further embodiment, said shift register shifts previously stored values that are lower than a new value to provide storage for the new value. According to a further embodiment, if a class of a new score value matches a class of a cell, the respective score value can be shifted out towards the next cluster and the new value is stored in the cell. According to a further embodiment, the respective score value can be shifted out to an adder operable to add the score value with a new score value from said correlator and feed the result to a next cluster. According to a further embodiment, the correlator correlates a plurality of sequential symbols with a predetermined noiseless pattern to generate a score value. According to a further embodiment, a cell storing a class value and associated score value may comprise a first comparator for comparing said class value and a second comparator for comparing said score value. According to a further embodiment, a cell further may comprise a flag for indicating a highest value within a cluster and a flag for indicating that the cell is empty. According to a further embodiment, a cell further may comprise a multiplexer unit receiving class and score values from a cluster input and another cell of the cluster. According to a further embodiment, the cells of a cluster may form a circular shift register. According to a further embodiment, the preamble detector may comprise five clusters, wherein the first cluster comprises 12 cells, the second cluster comprises 6 cells, the third cluster comprises 4 cells, the fourth cluster comprises 2 cells, and the fifth cluster comprises a single cell.

According to another embodiment, a method for detecting a preamble in a sequential sample stream may comprise sequentially feeding an incoming sample stream to a correlator wherein the correlator correlates each sample of the sample stream; computing a correlation score value and determining an associated class value for each sample by said correlator and outputting the score and class value as output values; feeding each output value to a multiple cluster structure, wherein a first cluster receives output values from the correlator directly and the following clusters are coupled in series such that each cluster receives output values from the correlator and a preceding cluster, and processing said output values of the correlator and a cluster such that an n-th cluster, with n>1, accumulates the highest score values of n output values with matching class values.

According to a further embodiment of the method, a first cluster of said multiple cluster structure may store M score values and wherein each following cluster stores less score values than a preceding cluster. According to a further embodiment of the method, According to a further embodiment of the method, the method may comprise the step of correlating a plurality of sequential symbols with a predetermined noiseless pattern to generate the score value. According to a further embodiment of the method, stored score values within each cluster can be sorted from highest to lowest score value. According to a further embodiment of the method, a new output value with a higher score value than a previously stored score value in a cluster may force the lowest score value in the cluster to be discarded. According to a further embodiment of the method, the step of accumulating may comprise adding the score value forwarded by a preceding cluster with a new score value with matching class value forwarded by the correlator. According to a further embodiment of the method, each cluster may comprise a plurality of cells forming a circular shift register and the method comprises the step of shifting the circular shift register to perform a sorting of the stored score values within a cluster. According to a further embodiment of the method, the method may comprise feeding a new output value to a cluster and comparing the class value to stored class values and the comparing the score value of the new output value to stored score values. According to a further embodiment of the method, a match of class values may shift a stored score and class value towards the next cluster and updates respective cell with the score value.

SHORT DESCRIPTION OF THE DRAWINGS

Figure 1:
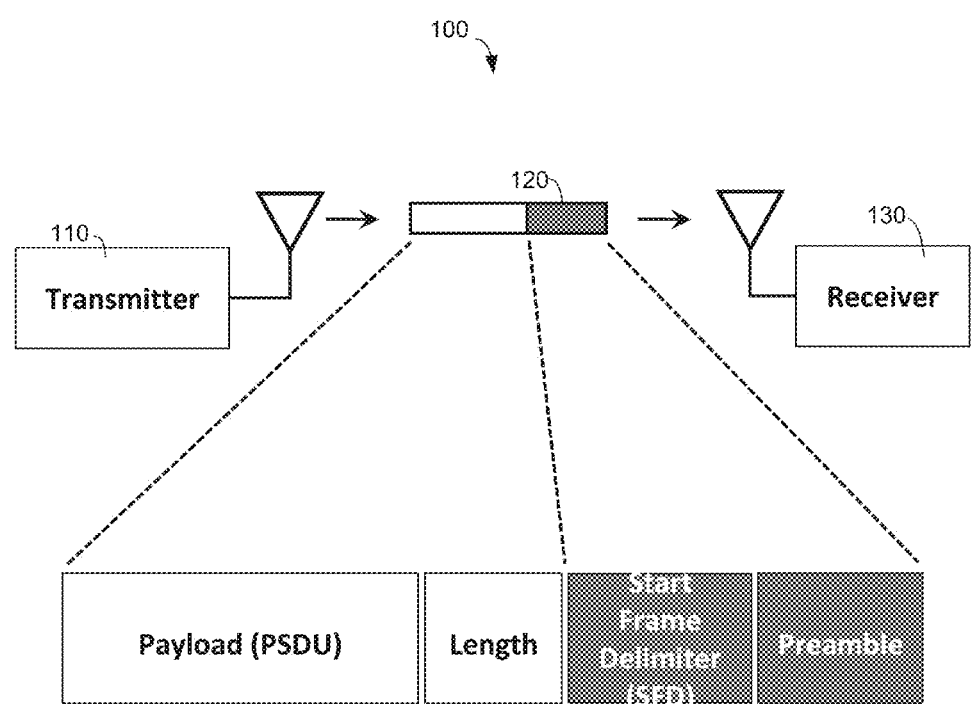
FIG. 1 shows a wireless data communications system in which a preamble is prefixed to a message body that is used for message detection and payload start determination.
Figure 2:
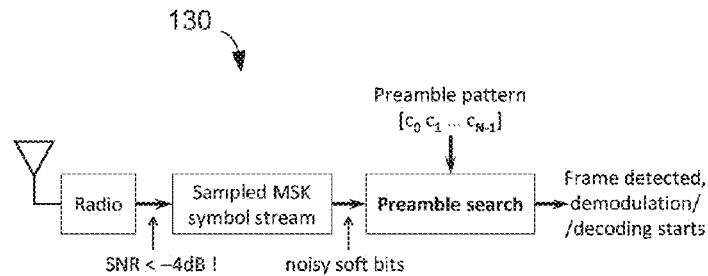
FIG. 2 is shows preamble detection within a receiver as the first step in digital baseband processing and works directly with the received noisy input samples.
Figure 3:
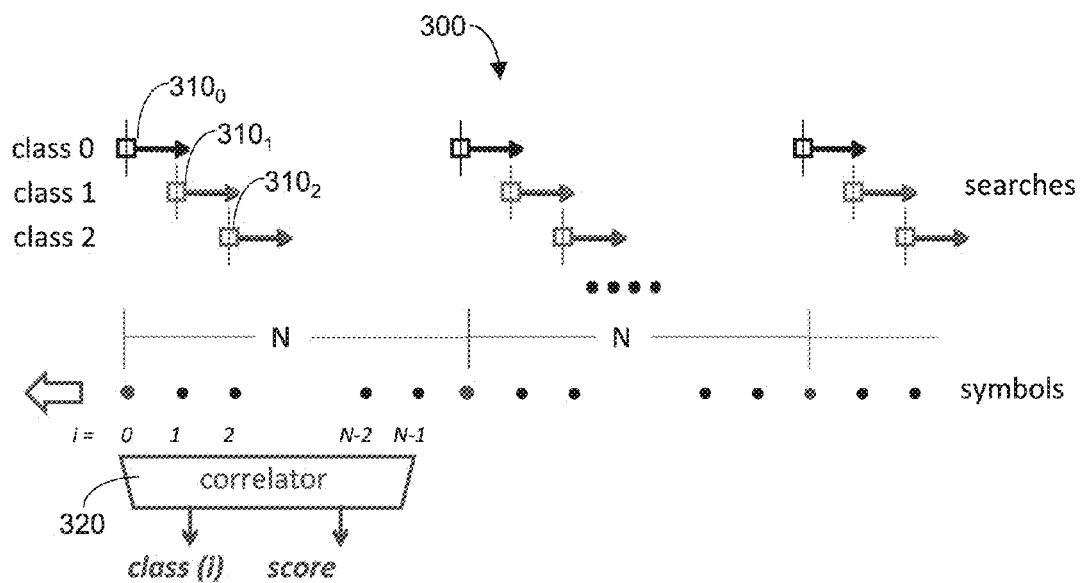

FIG. 3 presents the conceptual arrangement of the preamble search, especially showing that a single correlator is used to output match and identification information at each sample position.

Figure 4:
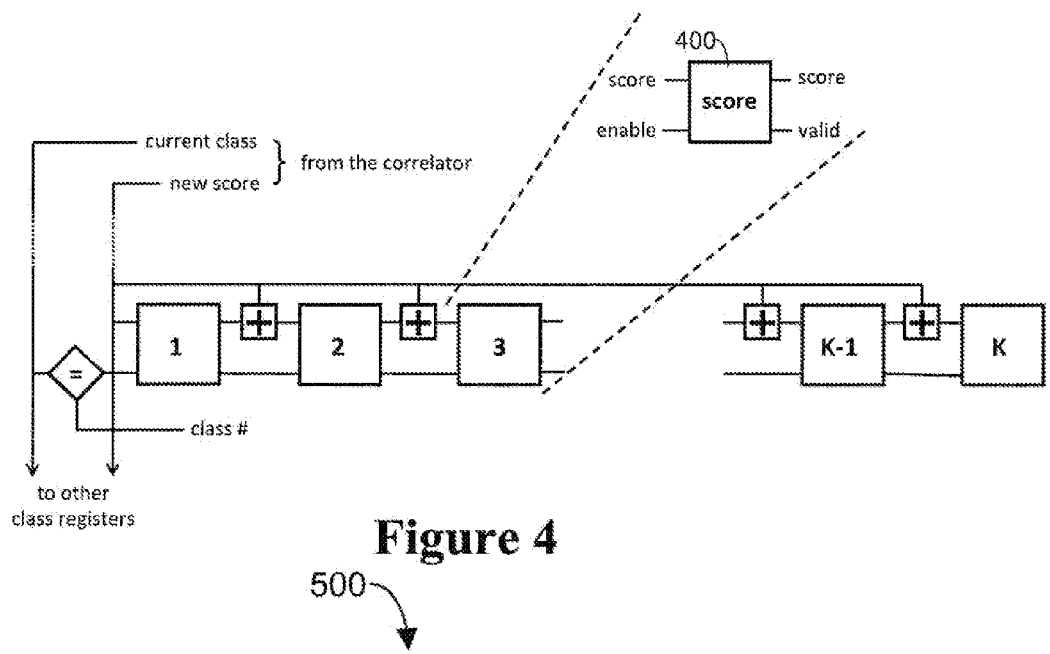

FIG. 4 shows the conceptual shift-register-like storage structure of cells that is suitable for keeping track of the searches in the same search class.

Figure 5:
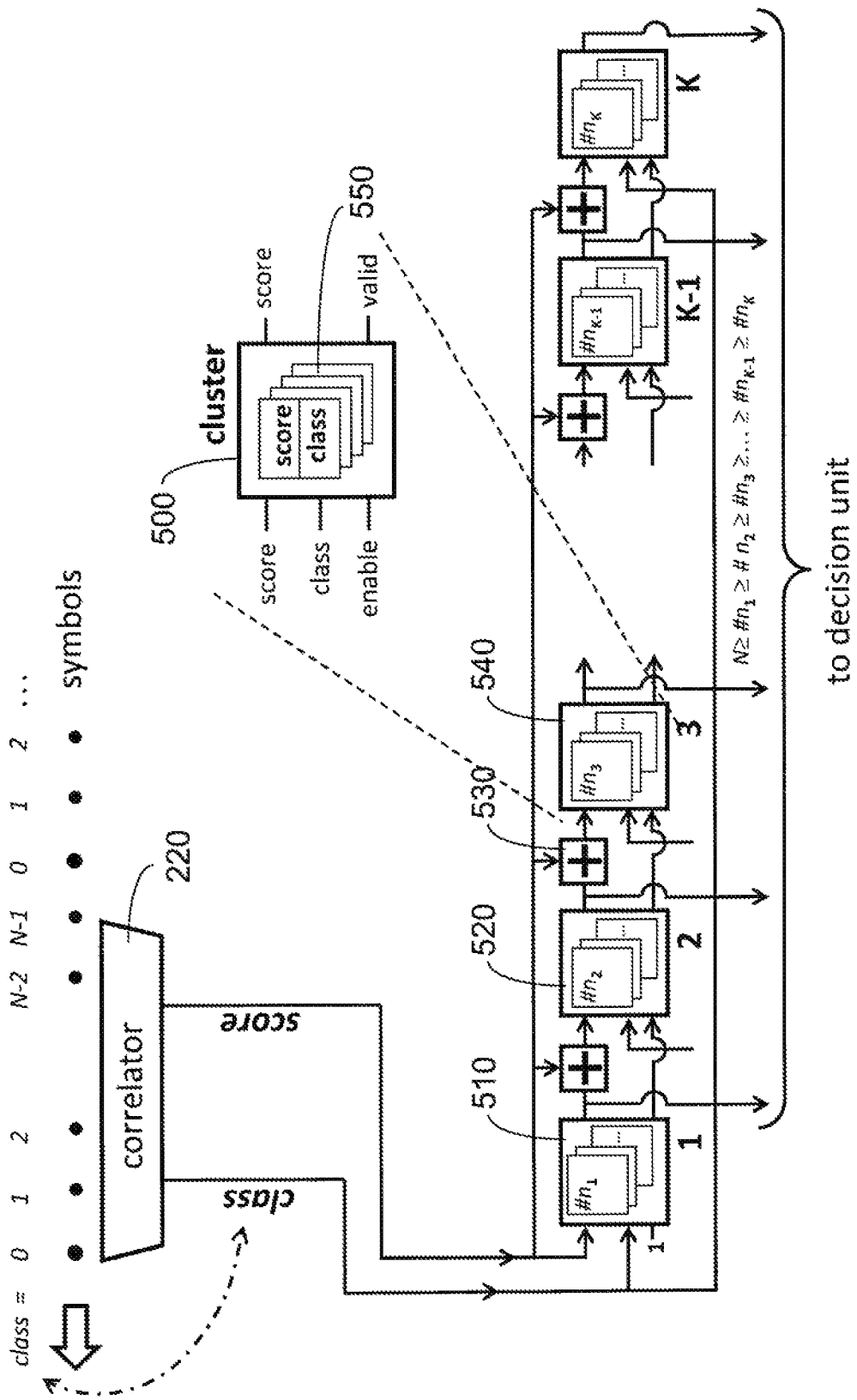

FIG. 5 presents the generalized shift-register-like storage structure each cluster of which is composed of a number of cells each cell tracking a search that has survived until that cluster.

Figure 6:
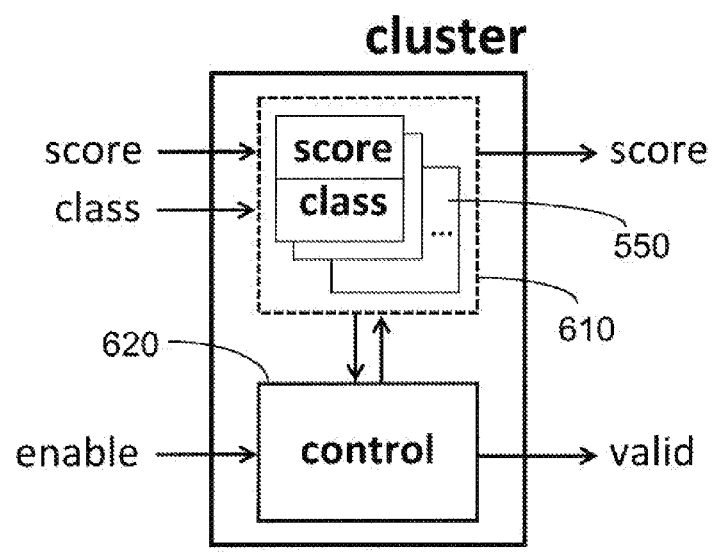

FIG. 6 shows a block diagram of a cluster according to an embodiment.

Figure 7:
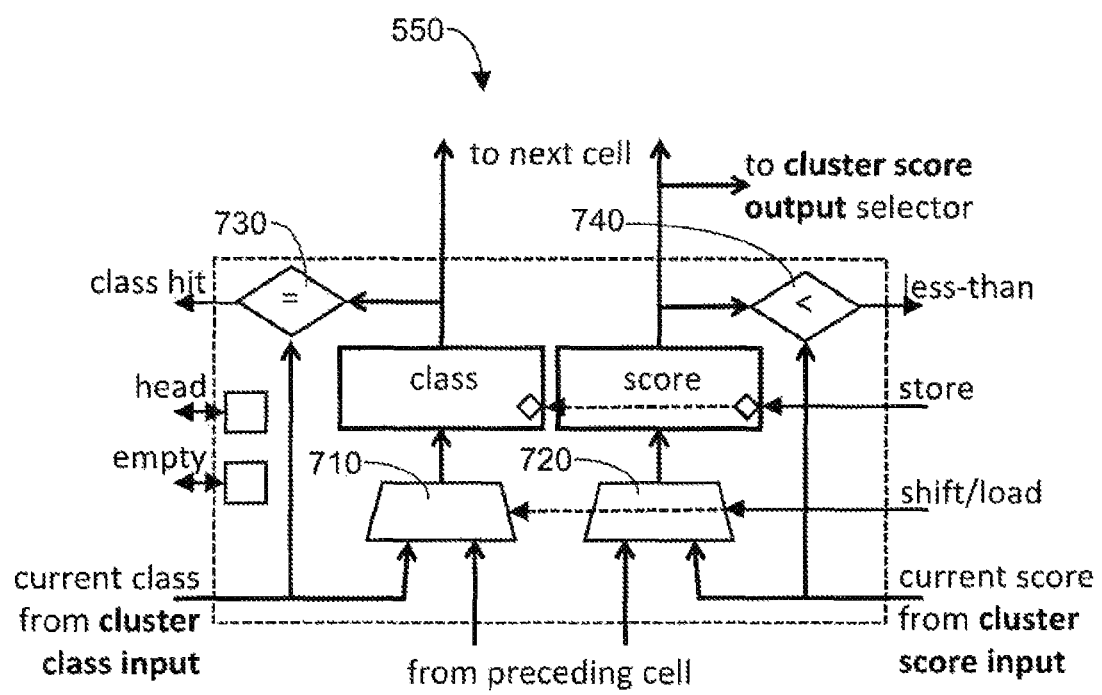

FIG. 7 shows the structure of a single cell a number of which is used for constructing each cluster of the storage structure in a specific embodiment of the general solution.

Figure 8:
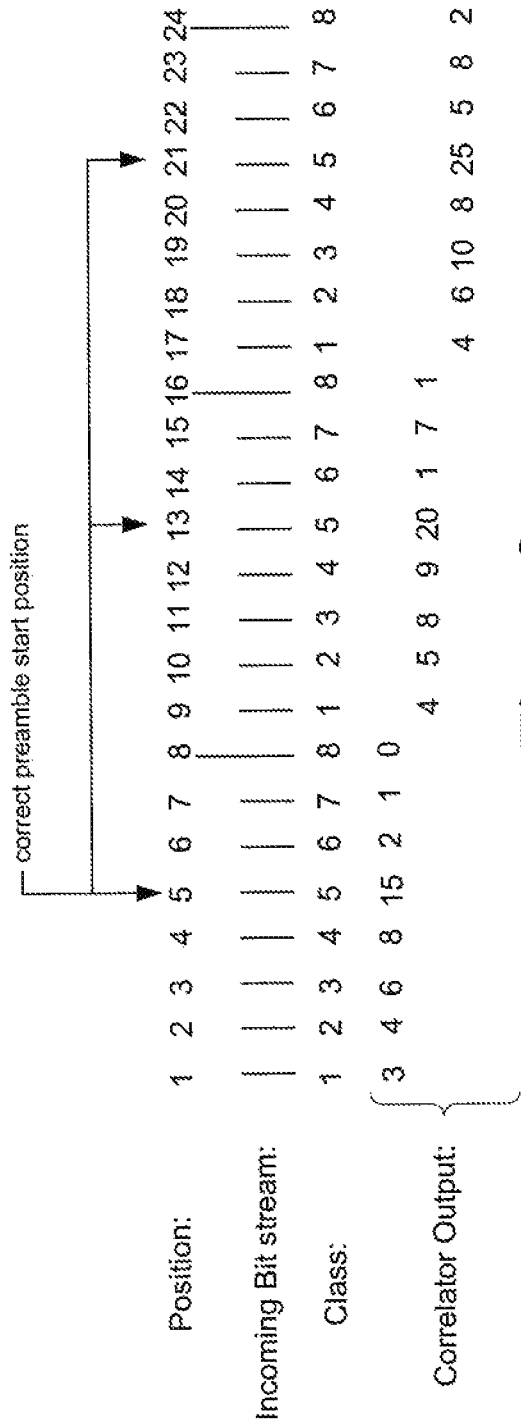
Figures 9A, 9B:
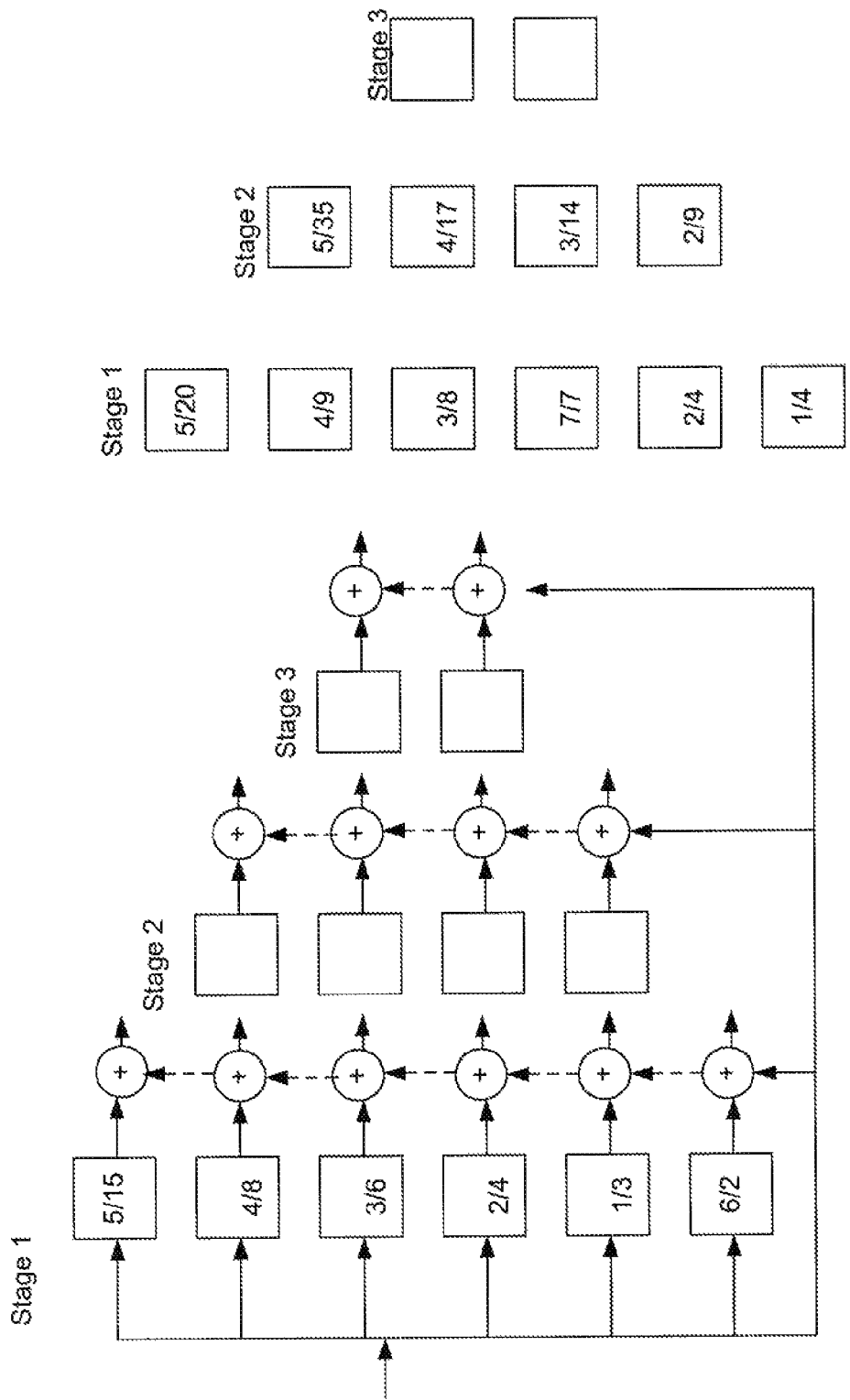

FIG. 8 shows an exemplary incoming signal stream with 24 samples from a correlator;

FIG. 9A-C show population of an exemplary cluster system according to various embodiments after 8, 16 and 24 samples have been processed.

DETAILED DESCRIPTION

Conceptual Foundation

First, the conceptual arrangement for keeping track of scores during the preamble search will be considered. As shown in FIG. 4, for each search class a shift register like structure of storage cells 400 is used for holding accumulated scores. Initially the cells 400 are empty later the score input is stored internally on the rising edge of the enable input. They continuously output the content on the score output. The valid output goes active while the enable input is active and the cell has a valid output (is not empty). The cells with active enable input update their contents with the value on the score input, the sum of the output from the immediately preceding cell and the current score from the correlator. There is a separate "shift register" for each search class and the output score of the last clusters are made available for decision.

Naturally, this conceptual arrangement is grossly inefficient at least in two aspects. First, the majority of searches can be prematurely aborted at different clusters of their processing as soon as it becomes evident that they cannot be the winner. Also a hit may be signaled by a search before it runs its maximal length (e.g. after the first cluster as usual in standard realizations.)

Storage Structure

FIG. 5 shows the conceptual arrangement for the optimized solution according to various embodiments. The outline structure is the same as before but rather than single storage cells the register is made up from clusters 500. The first cluster 510 receives the output of the correlator directly whereas the following clusters 540 receive the current output of the correlator and the output of the previous cluster 530 through an associated adder 530. A cluster 500 holds a number of storage cells 550 each cell of the cluster 500 now holding a search class number and the associated score. (A special score value, e.g. 0, or a separate flag may indicate an empty cell.) Also the current class number is made available for all clusters. The number of cells within a cluster is generally but not necessarily decreasing, i.e. may remain the same, from cluster to cluster. However, because less and less searches survive as they progress it may be beneficial to decrease the number of cells from cluster to cluster as explained below. Therefore, as shown by the dotted line within clusters 1 to K−1, each cluster may comprise a plurality of cells wherein usually the first cluster comprises the highest number of cells and the number of cells in each cluster may decrease. The example in FIG. 5 shows that the last stage K has only two cells. However, other decreasing cell number structures may apply in which the last stage has more than two cells or only a single cell. For example, a five stage structure may have twelve cells in the first stage, 6 cells in the second stage, 4 cells in the third stage, 2 cells in the fourth stage and 1 cell in the last stage when N=64. Other configurations can be used without departing from the principles discussed in this description.

FIG. 6 shows a block diagram of a cluster 500 comprising a plurality of cells 610 and associated control unit 620 to support recording/discarding the searches that survive/die at that cluster. The score and class inputs are connected to all cells in the cluster, the score content of the cells can be selectively presented on the score output of the cluster. Control unit 620 keeps the content in each associated cluster organized, acts on the enable input, if appropriate selects a cell, connects its score content to the score output of the cluster and decides whether valid output is to be indicated. A control unit 620 also includes logic to keep only the class/score pairs within the cells of the cluster that have the highest score values.

Tracking Algorithm

According to an embodiment, at each sample shift the following steps are executed concurrently in each cluster
If there is a cell in the cluster that belongs to the current class the score part is transferred to the cluster output, valid output is indicated and the cell is marked as empty.
If there is an empty cell the input score and class are stored into it (this is always the case if a cell is found in the previous step!);
otherwise the cell containing the smallest score within the cluster is located then
if the score at the input is greater than the score in the cell then the cell content is overwritten with the input score and class number;
otherwise the input is simply discarded.

As the score input of a cluster is the sum of the current score and that coming from the previous cluster, if any, the second step should be appropriately delayed from the first in order to account for logic delays.

According to various embodiments, any realization of this general algorithm is considered to be covered by this disclosure. The outline of a practical embodiment may be as follows.

Example embodiment

FIG. 7 shows one of various possible embodiments for a cell 600 which can be used in the cluster structure of a cluster 500. The cells 600 within a cluster are connected serially through multiplexers into a circular shift register. When the multiplexers 710, 720 of a cell are set into the shift direction the cell receives the contents of the preceding cell otherwise it receives the values present on the common score and class inputs of the cluster. The values available at the input of the cell are stored into the cell only when and if the store input is triggered. At the start all cells are empty as indicated by their empty flags. Later, at each step, the cells store the class/score pairs with the highest score values that have appeared at the corresponding cluster input until that step in the search. The list of class/score pairs is ordered highest to lowest in the shift direction and the order is maintained after updates occur in the step. The cell containing the first element of the list (containing the highest stored score value) is marked by setting the head flag. Each cell also has an equality comparator 730 that compares its stored class to that presented at the class input through multiplexer 710 of the cluster, and a less-than comparator 740 that compares its stored score to that presented at the score input through multiplexer 720 of the cluster (empty cell always compare as less).

According to the embodiment shown in FIG. 7, at each sample shift, the above features are used to implement the following algorithm within a cluster.

Step 1

If there is no cell in the cluster that belongs to the current class proceed to Step 2.
Otherwise the score part of the located cell is transferred to the cluster output, valid output is indicated and the cell is marked empty. Furthermore:
If the located cell was marked as head the head mark is shifted to the next cell.
Otherwise the part of the shift register between the head cell and the empty one inclusive is shifted. (Thus closing the gap opened by emptying the located cell.) The head mark shifts with the head cell and the former head cell is marked empty.

Step 2

Cells with less-than indication are shifted and the input class and score values are stored into the newly freed cell.

Decision Procedure

The score outputs are presented to the decision unit. The decision unit sets acceptance and rejection thresholds for each cluster. If during the search one of the scores exceeds its corresponding acceptance threshold the search is terminated and the content of the correlator establishes the timing raster. If the search is terminated because the entire preamble has been used then (i) if all scores fall below the rejection threshold then message reception is abandoned, (ii) otherwise the search class having the largest score in the last cluster is declared winner. Threshold comparators may be incorporated within the control unit associated with each cell or may belong to a separate decision unit.

Selecting the search length (K), number of cells in the individual clusters, the various decision thresholds involve theoretical approximations but usually require extensive simulation as well.

FIG. 8 shows an exemplary incoming sample stream of correlation magnitudes. The incoming sample stream is shown by vertical lines and divided into 8-sample sections as shown by the elongated vertical lines. Here, each class is associated with a respective sample position of an 8-sample section. Furthermore, it is assumed that the correct repetitive preamble in this example starts at position 5 within each 8-sample. Exemplary output values are shown as integers for a better understanding of the principles according to various embodiments.

FIG. 9A-C show examples of the outcome within a three cluster system when the sorting algorithm as discussed above is applied to this sample stream. To this end, FIG. 9A shows a simplified three cluster system in which the first cluster has three cells, the second cluster has two cells and the third cluster has a single cell. Blank cells designate empty cells. It is assumed that the entire three cluster system has been reset before the sample stream is received and all cells are therefore empty. FIG. 9A shows the population of values within the system after 8 samples have been received and processed by the correlator. Values within a cell are shown as "class/score." As can be seen, the algorithm sorts and accordingly rearranges all incoming values and the highest values are shown from top to bottom. The second and third cluster are shown empty after 8 incoming values due to invalid or non-matching outputs of the preceding cluster. The cells in cluster 2 and 3 will be populated when valid output values are shifted out of the preceding cluster and the respective class coincides with the current incoming class. For example, when the fifth sample in the second group at position 13 is processed, the correlator outputs class=3 and score=20. Thus, according to the principles described above, the value of the top cell in cluster 1 matches the class of this correlator output and therefore, its content is shifted to the output and the following adder adds the current score value to the cluster 1 value resulting in a new score value of 6+20=26 which will be stored in the highest cell of cluster 2 as it is the highest value in cluster 2. FIG. 9B shows the population and propagation of score values after 16 samples have been received. The cells of cluster 3 are populated in a similar manner. Thus, FIG. 9C shows the population after 24 samples have been received. As expected, class 5 will populate the highest cell in cluster 3 and therefore the fifth position in each section will mark the beginning of the preamble in the incoming sample stream.

As mentioned above, the principles according to various embodiments can be easily applied in hardware and/or software.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed:

1. A preamble detector, comprising:
a correlator outputting for every sample position of a preamble part of an incoming sampled signal stream a score and associated class value, wherein the correlator correlates sequential symbols starting at each sample position;
a multiple cluster unit receiving the class and score output values from the correlator, wherein a first cluster receives output values from the correlator and following clusters are coupled in series such that each cluster receives output values from the correlator and a preceding cluster and wherein said output values of the correlator and a cluster are processed such that an n-th cluster of the multiple cluster unit, with n>1, accumulates a highest score value of n score values with matching class values.

2. The preamble detector according to claim 1, wherein a score value is determined from the value of the correlation of an N-sample preamble pattern and the sequence of N signal samples commencing at said position and wherein a class number is 0 at the starting sample position, incremented by 1 at each subsequent position and returns to 0 after the value N−1 is reached, wherein N is an integer.

3. The preamble detector according to claim 1, wherein a first cluster comprises a plurality of cells, each cell being operable to store a score and associated cell value and wherein each following cluster coupled in series has less cells than any preceding cluster.

4. The preamble detector according to claim 1, wherein each cluster has three input connections for enable, class, and score, two output connections for valid, and score and comprises a control unit for updating, discarding and advancing values stored within a cluster.

5. The preamble detector according to claim 1, further comprising a plurality of adding units for coupling two clusters, wherein the adding units receive output score values of a preceding cluster and the output score values of the correlator and are operable to add the score values when the associated class values match.

6. The preamble detector according to claim I, wherein each cluster sorts score values in said cells from highest to lowest value and updates and/or rearranges said cells corresponding to sequential incoming new score values.

7. The preamble detector according to claim 1, wherein a cluster is formed by a plurality of cells forming a circular shift register.

8. The preamble detector according to claim 5, wherein said shift register shifts previously stored values that are lower than a new value to provide storage for the new value.

9. The preamble detector according to claim 5, wherein if a class of a new score value matches a class of a cell, the respective score value is shifted out towards the next cluster and the new value is stored in the cell.

10. The preamble detector according to claim 9, wherein the respective score value is shifted out to an adder operable to add the score value with a new score value from said correlator and feed the result to a next cluster.

11. The preamble detector according to claim 1, wherein the correlator correlates a plurality of sequential symbols with a predetermined noiseless pattern to generate a score value.

12. The preamble detector according to claim 1, wherein a cell storing a class value and associated score value comprises a first comparator for comparing said class value and a second comparator for comparing said score value.

13. The preamble detector according to claim 12, wherein a cell further comprises a flag for indicating a highest value within a cluster and a flag for indicating that the cell is empty.

14. The preamble detector according to claim 12, wherein a cell further comprises a multiplexer unit receiving class and score values from a cluster input and another cell of the cluster.

15. The preamble detector according to claim 14, wherein the cells of a cluster form a circular shift register.

16. The preamble detector according to claim 1, comprising five clusters, wherein the first cluster comprises 12 cells, the second cluster comprises 6 cells, the third cluster comprises 4 cells, the fourth cluster comprises 2 cells, and the fifth cluster comprises a single cell.

17. A method for detecting a preamble in a sequential sample stream, comprising:
sequentially feeding an incoming sample stream to a correlator wherein the correlator correlates sequential symbols of the incoming sample stream starting at each sample position;
computing a correlation score value and determining an associated class value for each sample by said correlator and outputting the score and class value as output values;
feeding each output value to a multiple cluster structure, wherein a first cluster receives output values from the correlator directly and following clusters are coupled in series such that each cluster receives output values from the correlator and a preceding cluster, and
processing said output values of the correlator and a cluster such that an n-th cluster, with n>1, accumulates a highest score value of n output values with matching class values.

18. The method according to claim 17, wherein a first cluster of said multiple cluster structure stores score values and wherein each following cluster stores less score values than a preceding cluster.

19. The method according to claim 17, comprising the step of correlating a plurality of sequential symbols with a predetermined noiseless pattern to generate the score value.

20. The method according to claim 17, wherein stored score values within each cluster are sorted from highest to lowest score value.

21. The method according to claim 17, wherein a new output value with a higher score value than a previously stored score value in a cluster forces the lowest score value in the cluster to be discarded.

22. The method according to claim 17, wherein the step of accumulating comprises adding the score value forwarded by a preceding cluster with a new score value with matching class value forwarded by the correlator.

23. The method according to claim 17, wherein each cluster comprises a plurality of cells forming a circular shift register and the method comprises the step of shifting the circular shift register to perform a sorting of the stored score values within a cluster.

24. The method according to claim 22, comprising feeding a new output value to a cluster and comparing the class value to stored class values and the comparing the score value of the new output value to stored score values.

25. The method according to claim 23, wherein a match of class values shifts a stored score and class value towards the next cluster and updates respective cell with the score value.

* * * * *